US012806993B2

(12) United States Patent
Patelczyk et al.

(10) Patent No.: US 12,806,993 B2
(45) Date of Patent: Nov. 24, 2026

(54) CRYOGENIC FUEL TANK VENTING SYSTEM AND METHOD

(71) Applicant: Chart Inc., Ball Ground, GA (US)

(72) Inventors: Jeffrey Patelczyk, Cumming, GA (US); Thomas K. Drube, Lakeville, MN (US)

(73) Assignee: Chart Inc., Ball Ground, GA (US)

( * ) Notice: Subject to any disclaimer, the term of this patent is extended or adjusted under 35 U.S.C. 154(b) by 739 days.

(21) Appl. No.: 18/063,306

(22) Filed: Dec. 8, 2022

(65) Prior Publication Data

US 2023/0182564 A1 Jun. 15, 2023

Related U.S. Application Data

(60) Provisional application No. 63/287,690, filed on Dec. 9, 2021.

(51) Int. Cl.

| | |
|---|---|
| ***B60K 15/035*** | (2006.01) |
| ***B60K 15/03*** | (2006.01) |
| ***B60L 50/75*** | (2019.01) |

(52) U.S. Cl.

CPC .. *B60K 15/03504* (2013.01); *B60K 15/03006* (2013.01); *B60L 50/75* (2019.02);

(Continued)

(58) Field of Classification Search

CPC ........ B60K 15/03504; B60K 15/03006; B60K 2015/03315; B60K 2015/03557; B60K 2015/03585; B60K 15/03; B60L 50/75; B60L 58/13; B60L 58/40; Y02E 60/50; F02M 21/0221; F02M 21/06;

(Continued)

(56) References Cited

U.S. PATENT DOCUMENTS 6,659,730 B2 * 12/2003 Gram ...................... F04B 19/06 417/901
7,765,961 B2 * 8/2010 Rutledge .................. B60L 7/10 123/3

(Continued)

FOREIGN PATENT DOCUMENTS

CA 2117944 C * 8/1998 ........... F25D 29/001
CN 110303944 A * 10/2019 .............. B60L 53/62

(Continued)

OTHER PUBLICATIONS

M. S. Haberbusch, R. J. Stochl, C. T. Nguyen, A. J. Culler, J. S. Wainright and M. E. Moran, "Rechargeable cryogenic reactant storage and delivery system for fuel cell powered underwater vehicles," Proceedings of the 2002 Workshop on Autonomous Underwater Vehicles, 2002, pp. 103-109 (Year: 2002).*

(Continued)

*Primary Examiner* — M Baye Diao

(74) *Attorney, Agent, or Firm* — Edell, Shapiro & Finnan, LLC

(57) ABSTRACT

A cryogenic fuel tank system includes a fuel tank configured to contain a cryogenic liquid with a headspace above the cryogenic liquid configured to contain cryogenic vapor. A fuel cell converts cryogenic vapor from the headspace to electricity and water vapor. A vent valve directs excess cryogenic vapor from the headspace to the fuel cell when a pressure in the fuel tank exceeds a predetermined pressure level.

20 Claims, 2 Drawing Sheets

(52) U.S. Cl.
CPC ............... *B60K 2015/03315* (2013.01); *B60K 2015/03557* (2013.01); *B60K 2015/03585* (2013.01)

(58) Field of Classification Search
CPC .......... F02M 21/0206; H01M 8/04089; H01M 8/04626; H01M 8/04708; H01M 8/22; H01M 16/006; H01M 8/225; Y02T 90/40
USPC .......................................................... 320/109
See application file for complete search history.

(56) References Cited

U.S. PATENT DOCUMENTS

| | | | | |
|---|---|---|---|---|
| 8,384,342 | B2 | 2/2013 | Hasegawa | |
| 10,087,896 | B1 * | 10/2018 | Perez | F02D 41/26 |
| 10,369,919 | B2 * | 8/2019 | Van Bebber | B60K 6/52 |
| 2003/0221433 | A1 * | 12/2003 | Gustafson | F02D 19/022 62/48.1 |
| 2008/0110514 | A1 * | 5/2008 | Yoshida | H01M 8/04089 137/628 |
| 2016/0315338 | A1 * | 10/2016 | Nada | H01M 8/04253 |
| 2018/0128211 | A1 | 5/2018 | Perez | |
| 2018/0145354 | A1 | 5/2018 | Rau et al. | |
| 2022/0344689 | A1 * | 10/2022 | Capuciati | B60L 50/75 |
| 2024/0278686 | A1 * | 8/2024 | Rehouma | B60L 58/13 |

FOREIGN PATENT DOCUMENTS

| | | | | |
|---|---|---|---|---|
| DE | 102017004448 | A1 | 11/2018 | |
| DE | 102018216175 | A1 | 3/2020 | |
| EP | 1236950 | A2 * | 9/2002 | F17C 13/04 |
| EP | 1325829 | A2 * | 7/2003 | B60K 15/03519 |
| EP | 1526595 | A2 | 4/2005 | |
| EP | 3396228 | B1 * | 2/2020 | F17C 9/02 |
| JP | 2001-167781 | A | 6/2001 | |
| JP | 2021-158113 | A | 10/2021 | |

OTHER PUBLICATIONS

International Search Report and Written Opinion, counterpart International App. No. PCT/US2022/052232, (Apr. 3, 2023) (14 pages).
English Translation of Office Action in counterpart Japan Application No. 2024-534289, mailed Aug. 28, 2026, 4 pages.

* cited by examiner

CRYOGENIC FUEL TANK VENTING SYSTEM AND METHOD

CLAIM OF PRIORITY

This application claims the benefit of U.S. Provisional Application No. 63/287,690, filed Dec. 9, 2021, the contents of which are hereby incorporated by reference.

FIELD OF THE DISCLOSURE

The present disclosure relates generally to tanks for cryogenic liquids and, more particularly, to a cryogenic fuel tank venting system and method.

BACKGROUND

Recently, out of concern for the environment and reducing harmful vehicle emissions, there has been a push toward vehicles that use fuels other than gasoline, diesel and/or other petroleum-based fuels. Fuel cells have been identified as a promising alternative fuel technology.

Fuel cells, in general, convert fuel into electricity that can be utilized to power vehicles or other devices that utilize a battery and/or motor for operation. Hydrogen fuel cells are increasing in popularity because, in operation, the hydrogen fuel is mixed with oxygen to produce water, heat and electricity without emitting other chemicals that are harmful to the environment.

Fuel cells typically consume high pressure gaseous hydrogen. However, industrial gases, such as hydrogen, are advantageously stored or transported in a liquid state so as to occupy a much smaller volume. Storing of liquid hydrogen, however, is challenging as it is extremely cold and has a low density. Heat leakage from the environment into the storage vessel or tank causes evaporation so that the pressure therein increases. The problem is increased for smaller containers, such as vehicle tanks. Venting of hydrogen gas to the atmosphere is undesirable, particularly if the vehicle is in a confined space where the hydrogen gas could accumulate. Being able to extend the time before required venting of hydrogen vapor to the atmosphere from a tank, or the avoidance of such venting altogether, is desirable.

SUMMARY OF THE DISCLOSURE

There are several aspects of the present subject matter which may be embodied separately or together in the methods, devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a cryogenic fuel tank system includes a fuel tank configured to contain a cryogenic liquid with a headspace above the cryogenic liquid containing cryogenic vapor, a fuel cell configured to convert the cryogenic vapor to electricity and water vapor and a vent valve configured to direct excess cryogenic vapor from the headspace to the fuel cell when a pressure in the fuel tank exceeds a predetermined pressure level.

In another aspect, a system for powering a vehicle includes a fuel tank configured to contain a cryogenic liquid with a headspace above the cryogenic liquid containing cryogenic vapor, a battery, a vehicle motor, a fuel cell configured to convert cryogenic fluid from the fuel tank to electricity to power the vehicle motor and charge the battery and a vent valve configured to direct excess cryogenic vapor from the headspace to the fuel cell when a pressure in the fuel tank exceeds a predetermined pressure level so that the battery is charged.

In another aspect, a system for powering a vehicle includes a fuel tank configured to contain a cryogenic liquid with a headspace above the cryogenic liquid containing cryogenic vapor, a battery, a vehicle motor, a fuel cell configured to convert cryogenic fluid from the fuel tank to electricity to power the vehicle motor and charge the battery, a second fuel cell and a vent valve configured to direct excess cryogenic vapor from the headspace to the second fuel cell when a pressure in the fuel tank exceeds a predetermined pressure level.

In another aspect, a method for reducing atmospheric venting of cryogenic fuel vapor from a fuel tank of a vehicle powered by the cryogenic fuel, where the vehicle has a battery and a motor, includes the steps of directing fluid from the fuel tank to a fuel cell, converting the fluid to electricity using the fuel cell, powering the motor and partially charging the vehicle battery using the electricity, directing excess vapor from the tank to the fuel cell when a pressure in the tank exceeds a predetermined level, converting the excess vapor to additional electricity using the fuel cell and further charging the battery using the additional electricity.

In another aspect, a method for reducing atmospheric venting of cryogenic fuel vapor from a fuel tank of a vehicle powered by the cryogenic fuel, where the vehicle has a battery and a motor, includes the steps of directing fluid from the fuel tank to a first fuel cell, converting the fluid to electricity using the first fuel cell, powering the motor and partially charging the vehicle battery using the electricity, directing excess vapor from the tank to a second fuel cell when a pressure in the tank exceeds a predetermined level, converting the excess vapor to additional electricity using the second fuel cell and further charging the battery using the additional electricity.

DETAILED DESCRIPTION OF EMBODIMENTS

Embodiments of the cryogenic fuel tank venting system and method of the disclosure are described below as being incorporated into a fuel cell system for powering a vehicle. The systems and methods of the disclosure, however, may be utilized in any device or process that consumes liquid hydrogen (or any other cryogenic liquid). In addition, while the cryogenic fuel is described below as being hydrogen, the technology of the disclosure may be used in the storage of any cryogenic fluid.

Figure 1:
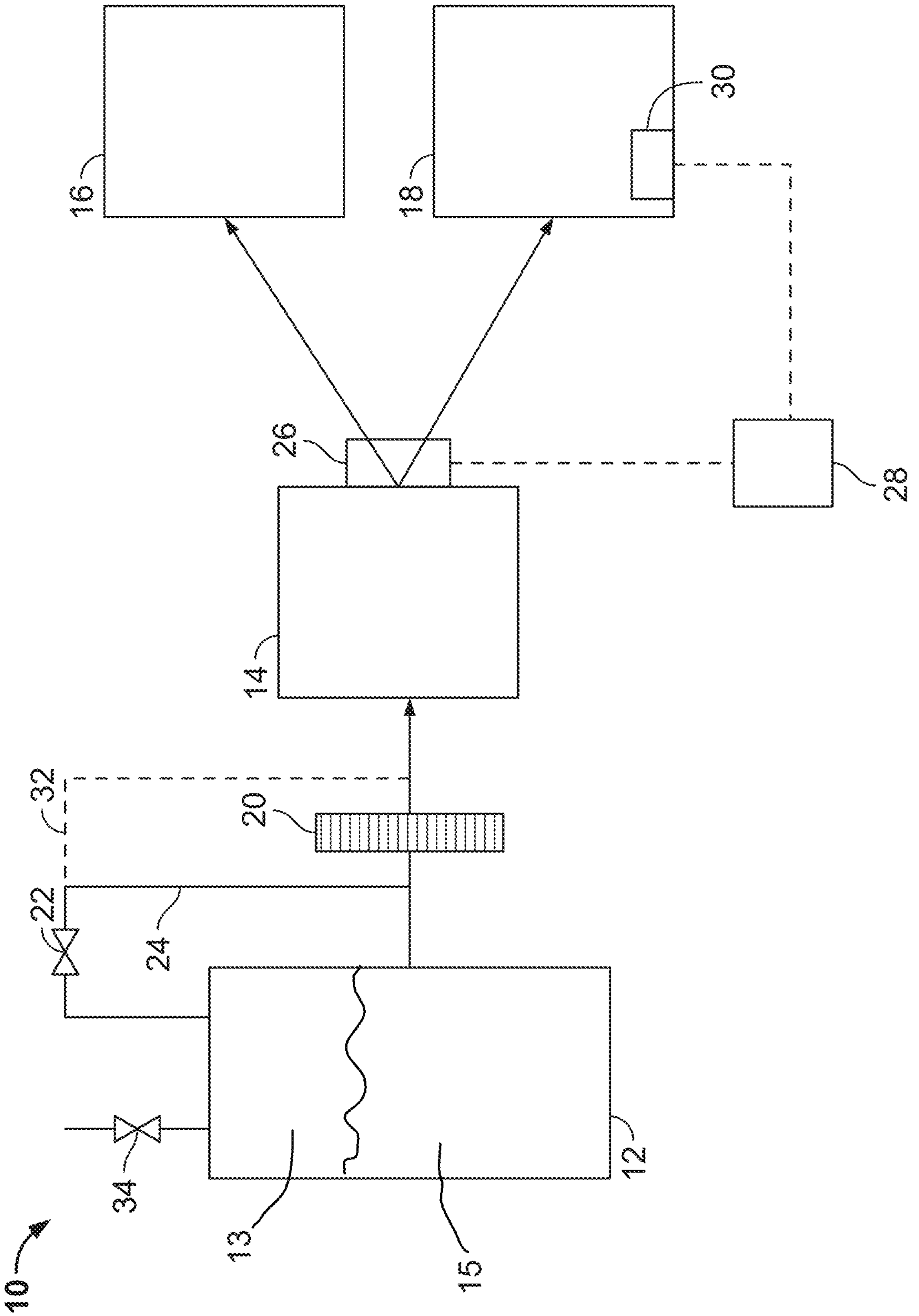
FIG. 1 is a schematic illustration of a first embodiment of the cryogenic fuel tank venting system and method of the disclosure.

A fuel cell system incorporating an embodiment of the tank venting system of the disclosure is indicated in general at 10 in FIG. 1. The fuel cell system 1 has a cryogenic fuel tank 12 that preferably contains liquid hydrogen. Although not shown in the figures, the cryogenic fuel tank may have an inlet port for refilling the tank with liquid hydrogen fuel. In alternative embodiments, the cryogenic tank may store a variety of cryogenic liquids.

The cryogenic fuel tank 12 can be jacketed to reduce heat transfer into the tank interior and may have insulation between inner and outer walls (or shells) of the jacketed tank. The space between the inner and outer walls may also or alternatively be vacuum insulated.

The fuel cell system 10 also includes a fuel cell 14. The fuel cell 14 can be any type of fuel cell known in the art. The fuel cell 14 can be a solid oxide, molten carbonate, phosphoric acid, proton exchange membrane, or alkaline fuel cell.

As is known in the art, the fuel cell system 10 can also include a heat exchanger 20 to convert liquid hydrogen from cryogenic fuel tank 12 into vapor for consumption in fuel cell 14. Alternatively, the heat exchanger 20 may be used to warm vapor from the headspace 13 of the tank 12, where the headspace 13 is above the cryogenic liquid 15 in the tank, prior to directing the vapor to the fuel cell. Heat exchanger 20 may be a multi-pass heat exchanger, but can also be any heat exchanger known in the art including, but not limited to, a single pass heat exchanger or a heat exchanger coil. Although one heat exchanger is shown, more than one heat exchanger can be utilized in fuel cell system 10. The fuel cell system 10 may utilize ambient heat or alternate heat sources, such as trim heaters or vaporizers.

In operation, liquid or vaporized hydrogen from fuel tank 12 is warmed in the heat exchanger 20 and then directed to the fuel cell 14 which converts the warmed vapor to electrical energy which is used to drive vehicle motor(s) 16 and/or charge the vehicle battery 18 under the direction of circuitry 26 and controller 28. As an example only, the system may feature a battery charge sensor 30 which determines the charge level of the battery 18 and provides corresponding data to the controller 28. This data may be used by the controller to determine when charging of the battery 18 by electricity from the fuel cell 14 should be initiated and/or terminated with the controller configuring circuitry accordingly.

In normal operation, such as when the vehicle is being driven, instead of fully charging the battery 100%, the battery is only partially charged. As an example only, the battery may be charged to about 80%-90% of the fully charged battery state. In alternative embodiments, the battery may be only partially charged to about 80% or less of the fully charged battery state or to any % amount less than the fully charged battery state.

By charging the battery 18 less than fully charged, the liquid hydrogen tank 12 may be vented to the fuel cell 14, rather than to the atmosphere, and used to charge the battery. More specifically, when the vehicle is idle with the liquid or vapor hydrogen not being withdrawn from the tank, liquid hydrogen in the tank 12 will vaporize and build tank pressure. When the pressure within the tank 12 reaches a predetermined venting pressure, a vent valve 22 of a venting circuit opens so that vapor flows out of the head space of the tank. This reduces the pressure within the tank and auto-refrigerates the liquid hydrogen therein.

Instead of venting the vapor to atmosphere, however, the former head space vapor from open vent valve 22 is directed to the fuel cell 14 through the heat exchanger 20 via line 24, whereby the warmed vapor is converted into electricity and directed by the circuitry 26 and controller 28 to charge the battery 18 the rest of the way (or partially the rest of the way) to 100% fully charged. As indicated by dashed line 32 of FIG. 1, the vapor may alternatively be directed to the fuel cell 14 without passing through the heat exchanger 20. Either way, the hydrogen that is used does not have any chance to collect in a confined space since that hydrogen is converted into benign water vapor. In the event that the battery has been fully charged, but pressure within the tank still needs to be vented, the electricity generated by the fuel cell using vapor vented from the tank headspace may be simply forfeited.

The vent valve 22 closes when the tank pressure drops below the predetermined venting pressure.

The tank 12 features an emergency vent valve 34 which vents to atmosphere if the pressure within the tank 12 rises to an emergency venting level that is above the predetermined venting pressure of vent valve 22.

Figure 2:
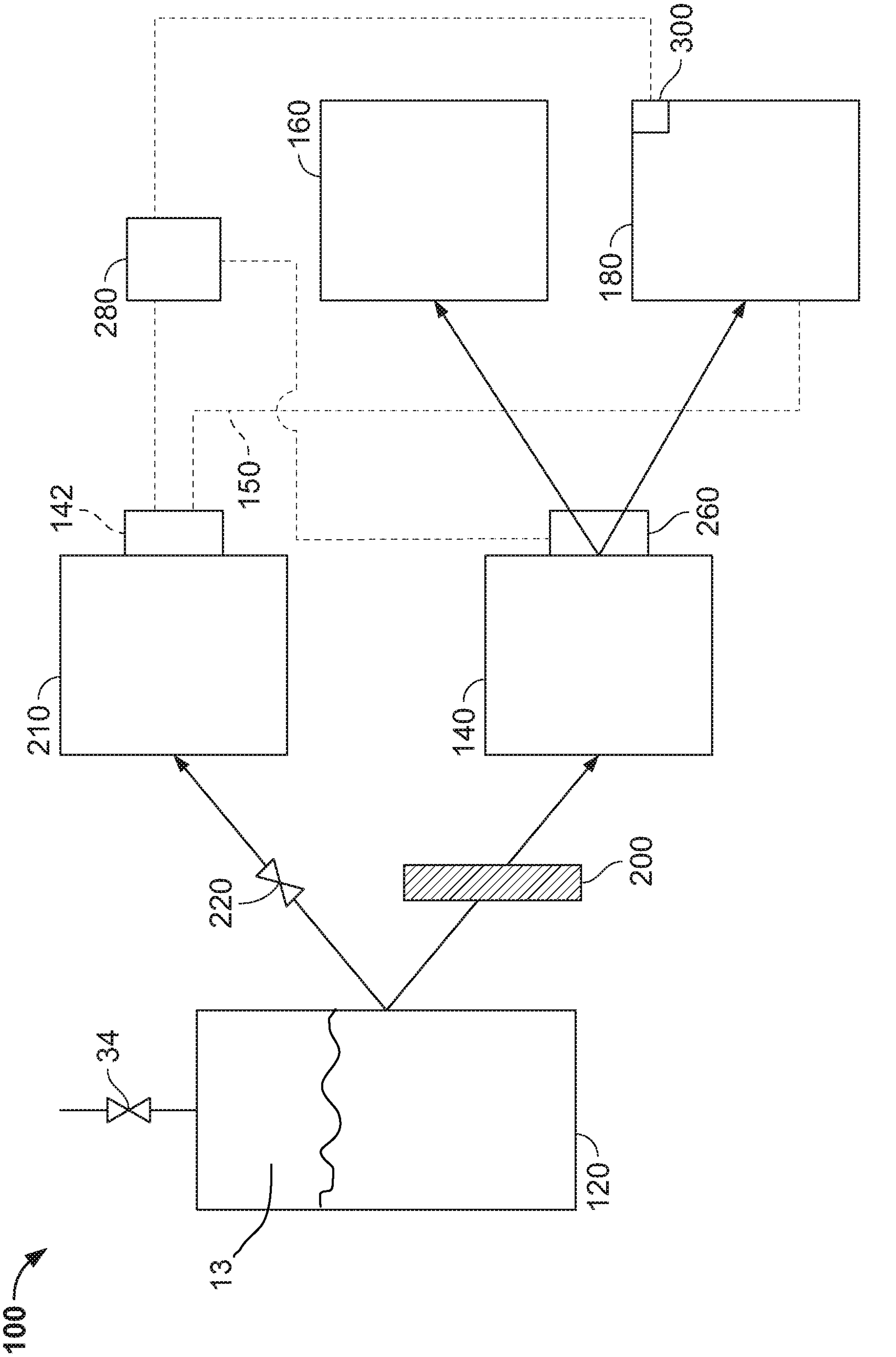
FIG. 2 is a schematic illustration of a second embodiment of the cryogenic fuel tank venting system and method of the disclosure.

A fuel cell system incorporating an alternative embodiment of the tank venting system of the disclosure in indicated in general at 100 in FIG. 2. Fuel cell system 100 may include the components of fuel cell system 10 (with the same functionality) and the same components are numbered similarly. Components of FIG. 1 not illustrated in FIG. 2 may also be optionally included in the system of FIG. 2.

Fuel cell system 100 notably further include a second fuel cell 210. In the embodiment of FIG. 2, second fuel cell 210 is configured independently as a vent gas converter. The energy potential of the fuel cell 210 is forfeited for convenience and simplicity and the fuel cell 210 acts only to reduce pressure within the tank while preventing hydrogen gases from potentially accumulating outside of the fuel tank. When the pressure within the tank 120 reaches a predetermined venting pressure, a vent valve 220 of a venting circuit opens so that vapor flows out of the head space of the tank 120. This reduces the pressure within the tank and auto-refrigerates the liquid hydrogen therein.

Instead of venting the vapor to atmosphere, however, the former head space vapor from open vent valve 220 is directed to the fuel cell 210 which then converts the gas to release water and heat. As indicated previously, the electricity produced by the fuel cell 210 may simply be forfeited or, in an alternative embodiment, may be directed by line 150 to the partially charged vehicle battery 180 for further charging (as disclosed in the embodiment of FIG. 1) under the control of control circuitry 142 and controller 280, which determines the charge level of the battery 180 using sensor 300.

It should be noted that an alternative embodiment of the disclosure omits the heat exchanger 200, fuel cell 140 and its circuitry 260 (which are otherwise largely similar to fuel cell 14 and circuitry 26), motor 160 and battery 180 of FIG. 2 but retains tank 120, fuel cell 210 and vent valve 220 for tank pressure reduction with the hydrogen in tank 120 being primarily used for alternative purposes.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A system for powering a vehicle comprising:

- a fuel tank configured to contain a cryogenic liquid with a headspace above the cryogenic liquid containing cryogenic vapor;
- a battery;
- a vehicle motor;
- a fuel cell configured to convert cryogenic fluid from the fuel tank to electricity usable to power the vehicle, charge the battery, or both; and a vent valve configured to direct excess amounts of the cryogenic vapor from the headspace to the fuel cell when a pressure in the fuel tank exceeds a predetermined pressure level so that the battery is charged.

2. The system of claim 1 further comprising a heat exchanger configured to receive the cryogenic fluid from the fuel tank and to direct warmed cryogenic fluid to the fuel cell.

3. The system of claim 1 further comprising a controller operatively connected to circuitry, wherein the controller and the circuitry are configured to only partially charge the battery while the vehicle is in operation and to more fully charge the battery using electricity produced by the fuel cell using the excess amounts of the cryogenic vapor from the vent valve when the vehicle is idle.

4. The system of claim 1 wherein the cryogenic liquid is liquid hydrogen.

5. The system of claim 1 wherein the vent valve is configured to inhibit atmospheric venting of the excess amounts of the cryogenic vapor by directing the excess amounts of the cryogenic vapor from the headspace to the fuel cell.

6. A system for powering a vehicle comprising:

a fuel tank configured to contain a cryogenic liquid with a headspace above the cryogenic liquid containing cryogenic vapor;

a battery;

a vehicle motor;

a fuel cell configured to convert cryogenic fluid from the fuel tank to electricity to power the vehicle motor, charge the battery, or both;

a second fuel cell; and a vent valve configured to direct excess amounts of the cryogenic vapor from the headspace to the second fuel cell when a pressure in the fuel tank exceeds a predetermined pressure level.

7. The system of claim 6 wherein the cryogenic liquid is liquid hydrogen.

8. The system of claim 6 further comprising a heat exchanger configured to receive the cryogenic fluid from the fuel tank and to direct warmed cryogenic fluid to the fuel cell.

9. The system of claim 6 further comprising a heat exchanger configured to receive the excess amounts of the cryogenic vapor and direct warmed excess cryogenic vapor to the second fuel cell.

10. The system of claim 6 further comprising a controller configured to cause the fuel cell to only partially charge the battery while the vehicle is in operation and to more fully charge the battery using additional electricity produced by the second fuel cell using the excess amounts of the cryogenic vapor from the vent valve when the vehicle is idle.

11. A method for reducing atmospheric venting of a vapor of a cryogenic fluid acting as cryogenic fuel from a fuel tank of a vehicle powered by the cryogenic fuel, where the vehicle has a battery and a motor, the method comprising:

directing the cryogenic fluid from the fuel tank to a fuel cell;

converting the cryogenic fluid to electricity using the fuel cell;

powering the motor and partially charging the battery using the electricity;

directing excess vapor from the fuel tank to the fuel cell when a pressure in the fuel tank exceeds a predetermined level; and converting the excess vapor to additional electricity using the fuel cell; further charging the battery using the additional electricity.

12. The method of claim 11 wherein partially charging the battery includes charging the battery to less than 90%.

13. The method of claim 12 wherein partially charging the battery includes charging the battery to between 80 and 90%.

14. The method of claim 11 further comprising warming the cryogenic fluid as it is passed from the fuel tank to the fuel cell.

15. The method of claim 11 wherein directing fluid from the fuel tank to the fuel cell includes passing the cryogenic fluid through a heat exchanger before the fluid reaches the fuel cell.

16. The method of claim 11 wherein directing the excess vapor from the fuel tank to the fuel cell includes inhibiting atmospheric venting of the excess vapor by routing the excess vapor from a headspace of the fuel tank to the fuel cell.

17. A method for reducing atmospheric venting of a vapor of a cryogenic fuel from a fuel tank of a vehicle powered by the cryogenic fuel, where the vehicle has a battery and a motor, the method comprising:

directing fluid from the fuel tank to a first fuel cell; converting the fluid to electricity using the first fuel cell;

powering the motor and partially charging the battery using the electricity;

directing excess vapor from the fuel tank to a second fuel cell when a pressure in the fuel tank exceeds a predetermined level;

converting the excess vapor to additional electricity using the second fuel cell; and further charging the battery using the additional electricity.

18. The method of claim 17 wherein partially charging the battery includes charging the battery to less than 90%.

19. The method of claim 18 wherein partially charging the battery includes charging the battery to between 80 and 90%.

20. The method of claim 18 wherein directing the excess vapor from the fuel tank to the second fuel cell includes inhibiting atmospheric venting of the excess vapor by routing the excess vapor from a headspace of the fuel tank to the second fuel cell.

* * * * *